(12) United States Patent
Hargraves et al.

(10) Patent No.: US 12,098,751 B2
(45) Date of Patent: Sep. 24, 2024

(54) TWO-PIECE SEAL ASSEMBLY

(71) Applicant: Amsted Rail Company, Inc., Chicago, IL (US)

(72) Inventors: James Hargraves, Chesterfield, VA (US); Arman Sarwar, Midlothian, VA (US); James Myers, Chesterfield, VA (US)

(73) Assignee: Amsted Rail Company, Inc.

( * ) Notice: Subject to any disclaimer, the term of this patent is extended or adjusted under 35 U.S.C. 154(b) by 0 days.

(21) Appl. No.: 18/201,616

(22) Filed: May 24, 2023

(65) Prior Publication Data

US 2023/0383792 A1 Nov. 30, 2023

Related U.S. Application Data

(60) Provisional application No. 63/345,260, filed on May 24, 2022.

(51) Int. Cl.
  *F16J 15/44* (2006.01)
  *B60B 35/18* (2006.01)
  *F16C 33/78* (2006.01)

(52) U.S. Cl.
  CPC ............ *F16C 33/783* (2013.01); *B60B 35/18* (2013.01); *F16C 33/782* (2013.01); *F16J 15/44* (2013.01); *B60B 2900/511* (2013.01)

(58) Field of Classification Search
  CPC ... F16C 33/783; B60B 35/18; B60B 2900/511
  See application file for complete search history.

(56) References Cited

U.S. PATENT DOCUMENTS

| 4,817,846 A | 4/1989 | Eichinger | |
| 4,863,177 A * | 9/1989 | Rockwood | F16J 15/4472 277/416 |
| 6,142,479 A | 11/2000 | Fedorovich | |
| 2015/0097340 A1* | 4/2015 | Gulli | F16C 33/80 277/349 |
| 2016/0130967 A1* | 5/2016 | Kelly | F01D 11/003 415/174.5 |
| 2017/0097046 A1 | 4/2017 | Hadden | |
| 2019/0360532 A1* | 11/2019 | Liebe | F16J 15/3232 |

* cited by examiner

*Primary Examiner* — Vishal A Patel
(74) *Attorney, Agent, or Firm* — COZEN O'CONNOR (57) ABSTRACT

A two-piece seal assembly includes first and second seal subassemblies, each shaped as a semicircular ring. The first seal subassembly has a first stator subassembly and a first rotor subassembly that cooperate to form a first semicircular segment of a labyrinth. The second seal subassembly has a second stator subassembly and a second rotor subassembly that cooperate to form a second semicircular segment of the labyrinth. The first and second stator subassemblies, when affixed to each other, form a ring-shaped stator that encircles a rotation axis. The first and second rotor subassemblies, when affixed to each other, form a ring-shaped rotor that encircles the rotation axis and can rotate about the rotation axis relative to the stator. When the first and second seal subassemblies are affixed to each other, the first and second semicircular segments meet such that the labyrinth encircles the rotation axis.

20 Claims, 12 Drawing Sheets

TWO-PIECE SEAL ASSEMBLY

RELATED APPLICATIONS

This application claims priority to U.S. Provisional Patent Application No. 63/345,260, filed on May 24, 2022, the entirety of which is incorporated herein by reference.

BACKGROUND

Various applications involving rotating shafts include a housing or bearing that is sealed from the outside environment to both prevent water, dirt, and other contaminants from entering the housing as well as retain lubricant within the housing. The seal may be a contact seal that forms a physical barrier, typically an elastomer gasket, between the inside of the housing and the external environment. This physical barrier, however, requires direct contact between parts moving relative to each other. Thus, a contact seal produces friction which causes wear of the physical barrier, especially in the presence of particulate contaminants.

In contrast, a noncontact seal has no direct physical contact between non-rotating and rotating parts. One type of noncontact seal is a noncontact labyrinth seal that forms a labyrinth, or frustrated path, between stationary and rotating parts. The labyrinth limits the transport of material between the interior of the housing and the external environment and prevents the loss of lubricant out of the housing. A noncontact labyrinth-based seal also allows for some degree of movement between the stator and rotor of the seal.

SUMMARY

In embodiments, a two-piece seal assembly includes first and second seal subassemblies, each shaped as a semicircular ring. The first seal subassembly has a first stator subassembly and a first rotor subassembly that cooperate to form a first semicircular segment of a labyrinth. The second seal subassembly has a second stator subassembly and a second rotor subassembly that cooperate to form a second semicircular segment of the labyrinth. The first and second stator subassemblies, when affixed to each other, form a ring-shaped stator that encircles a rotation axis. The first and second rotor subassemblies, when affixed to each other, form a ring-shaped rotor that encircles the rotation axis and is rotatable about the rotation axis relative to the ring-shaped stator. When the first and second seal subassemblies are affixed to each other, the first and second semicircular segments meet such that the labyrinth encircles the rotation axis.

The two-piece seal assembly may be used in several applications. For example, it may be used as a bearing seal for rail products as an alternative to single-piece seals. In this case, the two-piece seal assembly can be advantageously replaced or serviced without having to remove an entire bearing assembly from a wheelset. Another application is automotive products, where the two-part seal may be installed on a drivetrain without having to disassemble and reassemble driveshafts and yokes. Another application is testing equipment, where test rigs can be built without the need to account for bearing installation dimensions. This allows for a standardized test rig to be constructed that can accommodate several different seal diameters.

DETAILED DESCRIPTION

Figure 1:
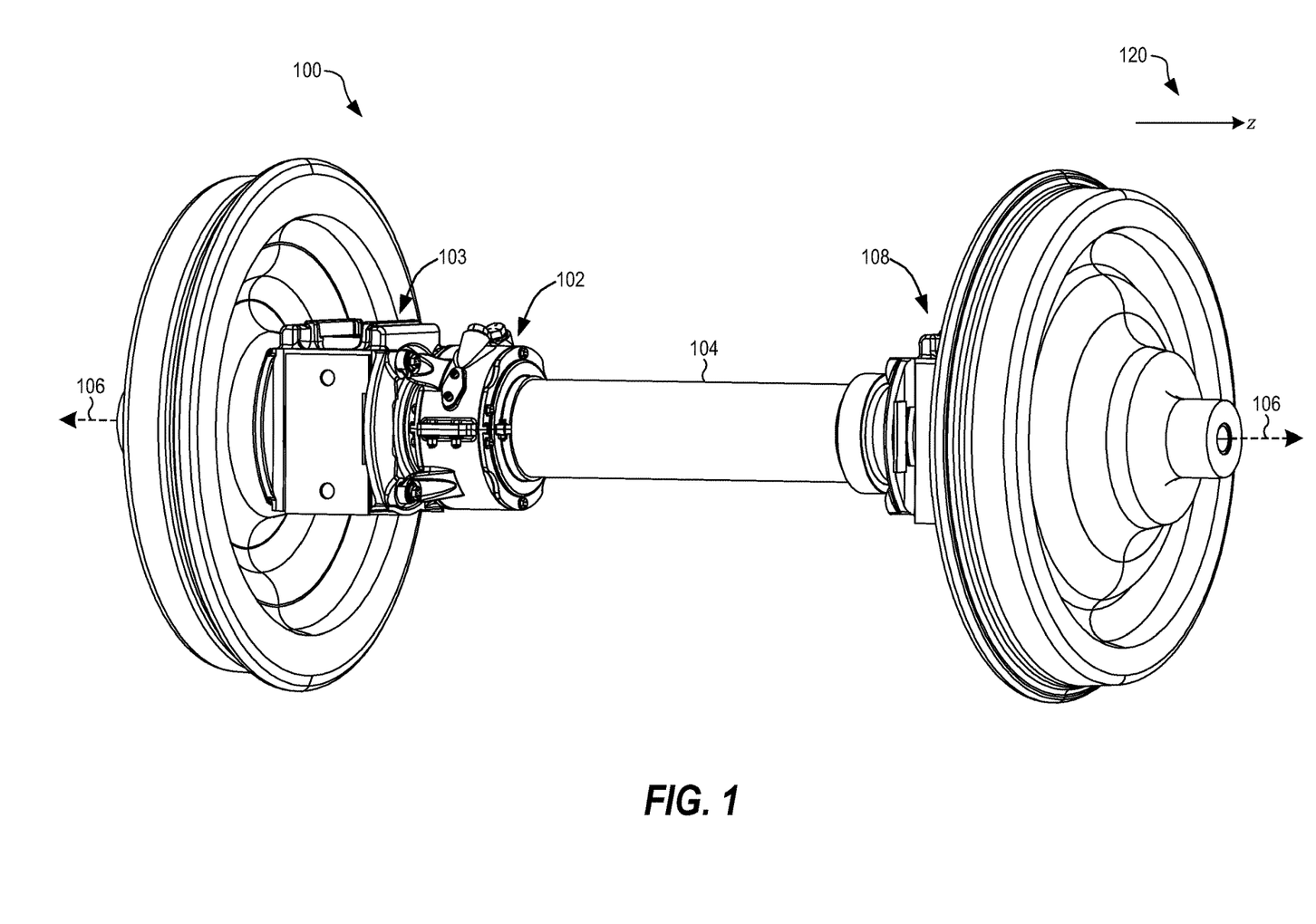
FIG. 1 is a perspective view of a wheelset, in an embodiment.

FIG. 1 is a perspective view of a wheelset 100 that includes a sensor housing 102 installed around an axle 104 that is rotatable about a rotation axis 106. The wheelset 100 also includes a first bearing assembly 103 located at one end of the axle 104 and a second bearing assembly 108 located at a second end of the axle 104 that is opposite to the first end. For clarity herein, it is assumed that the rotation axis 106 is parallel to a z axis of a coordinate system 120. Furthermore, the terms "axial" and "axially" refer to the direction parallel to the rotation axis 106 while the terms "radial" and "radially" refer to any direction orthogonal to the rotation axis 106.

The sensor housing 102 contains sensors and other devices for monitoring the wheelset 100 and its environment. To simplify the integration of the sensor housing 102 with the rest of the vehicle, the sensor housing 102 is stationary, i.e., it does not rotate with the axle 104. Accordingly, it is convenient to affix the sensor housing 102 to a stationary part of the first bearing assembly 108. However, the sensor housing 102 may alternatively be affixed to a different stationary part of the vehicle, and therefore may be located elsewhere along the axle 104. In one embodiment, the wheelset 100 includes, in addition to the first sensor housing 102, a second sensor housing located adjacent to the second bearing assembly 108 and affixed thereto.

Figure 2:
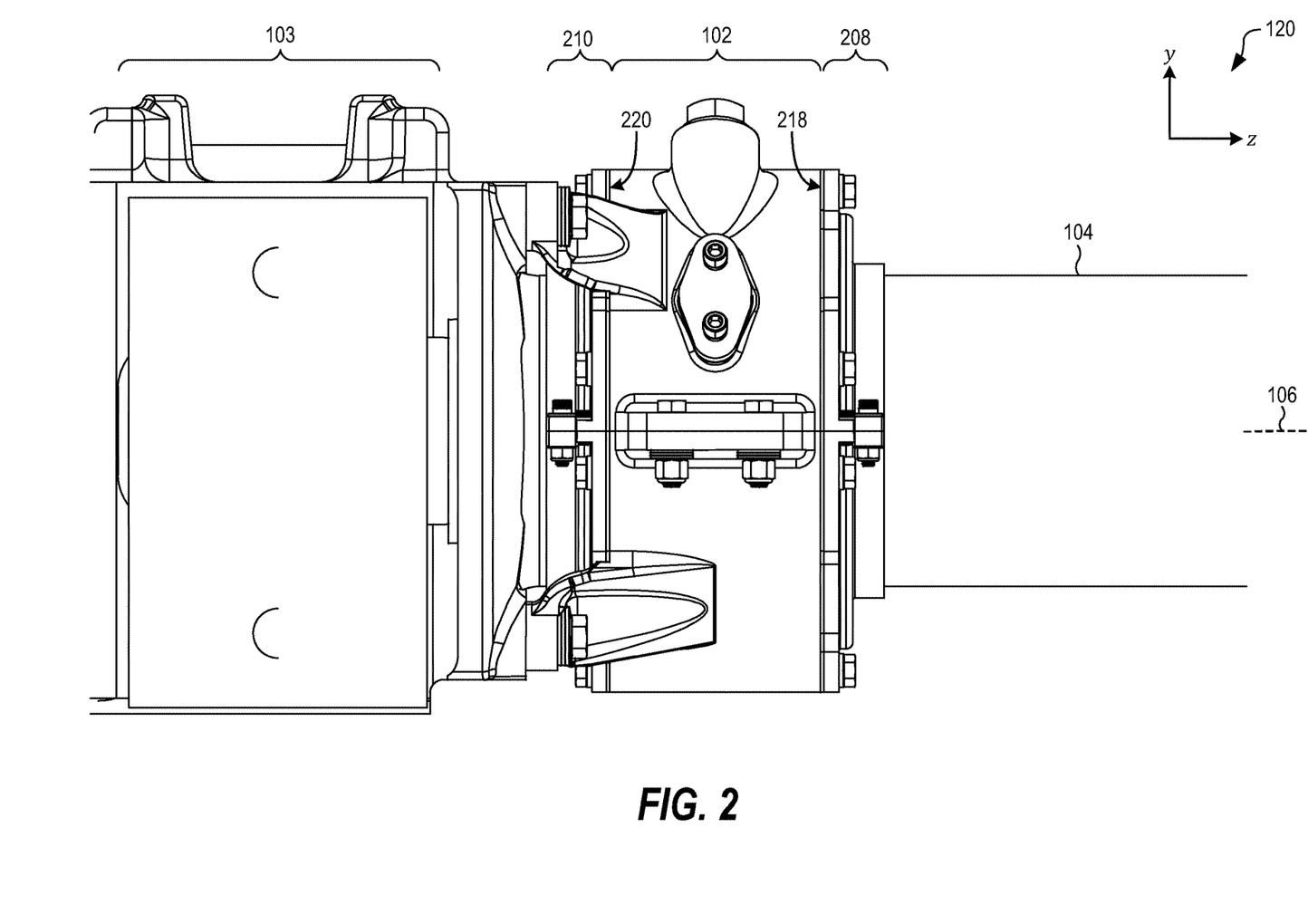
FIG. 2 is a side view of the wheelset of FIG. 1.

FIG. 2 is a side view of the wheelset 100 of FIG. 1 that shows in more detail how the sensor housing 102 may be installed. To protect the sensors and devices inside the sensor housing 102 from liquids and debris, a first seal assembly 208 is installed against a first axial end face 218 of the sensor housing 102. Similarly, a second seal assembly 210 is installed against a second axial end face 220 of the sensor housing 102. Each of the seal assemblies 208 and 210 is shaped as a ring or cylinder that encircles the axle 104.

Like most seals, the seal assemblies 208 and 210 of FIG. 2 will experience wear over time and eventually need to be replaced or repaired. This typically involves removing each of the seal assemblies 208 and 210 from the wheelset 100 and replacing one or more of its components (e.g., the gasket 480, bumper 126, and gasket 442 of FIG. 4) or replacing it entirely. Considering the position of the sensor housing 102 on the axle 104, replacing the seal assemblies 208 and 210 may be non-trivial and require considerable time and effort.

Figure 3:
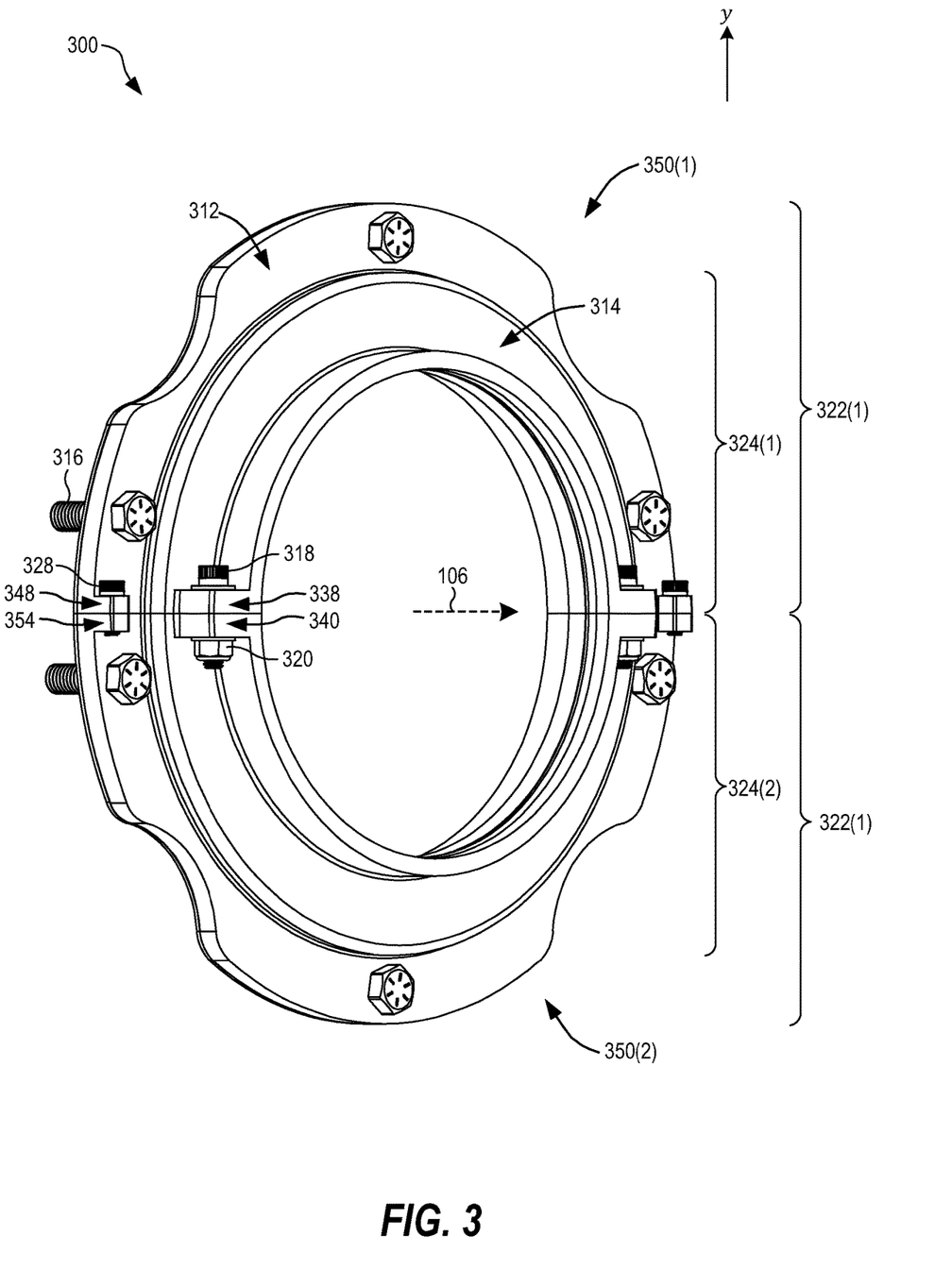
FIG. 3 is a perspective view of a two-piece seal assembly, in embodiments.

FIG. 3 is a perspective view of a two-piece seal assembly 300 for creating a noncontact seal. The two-piece seal assembly 300 has a first seal subassembly 350(1) and second seal subassembly 350(2), each of which is generally shaped as a semicircular ring. The subassemblies 350(1) and 350(2) are affixable to each other such that the seal assembly 300 is shaped as a circular ring that fully encircles the axle 104 (i.e., the circular ring extends 360° azimuthally around the rotation axis 106). The first seal subassembly 350(1) includes a first stator subassembly 322(1) and a first rotor subassembly 324(1). The second seal subassembly 350(2) includes a second stator subassembly 322(2) and a second rotor subassembly 324(2).

In embodiments, the two-piece seal assembly 300 is used for each of the seal assemblies 208 and 210 of FIG. 2. By forming the seal assembly 300 with two semicircular subassemblies 350(1) and 350(2), the two-piece seal assembly 300 can advantageously be installed around the axle 104 without having to remove one of the bearing assemblies 103 and 110 and sliding a single-piece seal along the axle 104. The two-piece seal assembly 300 can also advantageously be used when certain features of the wheelset 100 have an outer diameter that is too large to allow a single-piece seal to slide along the axle 104.

The two-piece seal assembly 300 includes a stator 312 that is rigidly affixed to the sensor housing 102 and is therefore stationary (i.e., non-rotating). The seal assembly 300 also includes a rotor 314 that is rigidly affixed to the axle 104 and therefore co-rotates with the axle 104. Each of the stator 312 and rotor 314 is ring-shaped and encircling the axle 104. During operation, the rotor 314 rotates continuously with respect to the stator 312.

The stator 312 includes the first stator subassembly 322(1) and the second stator subassembly 322(1), each of which is shaped as a semicircular ring. FIG. 3 shows two bolts 328 affixing the stator subassemblies 322(1) and 322(2) to each other at their azimuthal ends to form the stator 312. For clarity, only one of the bolts 328 is labeled in FIG. 3. The first stator subassembly 322(1) includes a first stator flange 348 that forms a clearance hole through which one bolt 328 can pass. The first stator subassembly 322(1) also includes a third stator flange that is not labeled in FIG. 3 (see third stator flange 748 in FIG. 7A). The second stator subassembly 322(2) includes a second stator flange 354 that, in the example of FIG. 3, forms a tapped hole for the one bolt 328. The second stator subassembly 322(2) also forms a fourth stator flange that is not labeled in FIG. 3. The bottom of the first stator flange 348 (in the −y direction) and top of the second stator flange 354 (in the +y direction) are flush with the mid-plane that divides the two-piece seal assembly 300 into the first seal subassembly 350(1) and the second seal subassembly 350(2). In the example of FIG. 3, the mid-plane is parallel to the x-z plane. Accordingly, the bottom of the first stator flange 348 and top of the second stator flange 354 contact each other when the stator subassemblies 322(1) and 322(2) are bolted together (see FIG. 12A).

The rotor 314 includes the first rotor subassembly 324(1) and the second rotor subassembly 324(2), each of which is shaped as a semicircular ring. In FIG. 3, two bolts 318 and two nuts 320 affix the rotor subassemblies 324(1) and 324(2) to each other at their azimuthal ends. For clarity, only one of the bolts 318 and one of the nuts 320 is labeled in FIG. 3. The first rotor subassembly 324(1) includes a first rotor flange 338 that forms a clearance hole through which one bolt 318 can pass. The first rotor subassembly 324(1) also includes a third rotor flange that is not labeled in FIG. 3 (see third rotor flange 638 in FIG. 6A). The second rotor subassembly 324(2) includes a second rotor flange 340 that also forms a clearance hole for the one bolt 318. The second rotor subassembly 324(2) also includes a fourth rotor flange that is not labeled in FIG. 3. The bottom of the first rotor flange 338 and top of the second rotor flange 340 are flush with the mid-plane that divides the two-piece seal assembly 300. Accordingly, the bottom of the first rotor flange 338 and top of the second rotor flange 340 contact each other when the rotor subassemblies 324(1) and 324(2) are bolted together (see FIG. 12A).

Additional or alternative types of hardware may be used to affix the stator subassemblies 322(1) and 322(2) together and to affix the rotor subassemblies 324(1) and 324(2) together. For example, the second stator flange 354 may form a clearance hole instead of a tapped hole. In this case, a nut (similar to the nut 320) may be used to tighten the one bolt 328. In another example, the first and fourth stator flanges form clearance holes while the second and third stator flanges form tapped holes. In this example, the stator subassemblies 322(1) and 322(2) exhibit 180° rotational symmetry about the rotation axis 106, and are therefore interchangeable. In yet another example, the nuts 320 are nyloc nuts that help prevent loosening of the bolts 318.

Figure 9A:
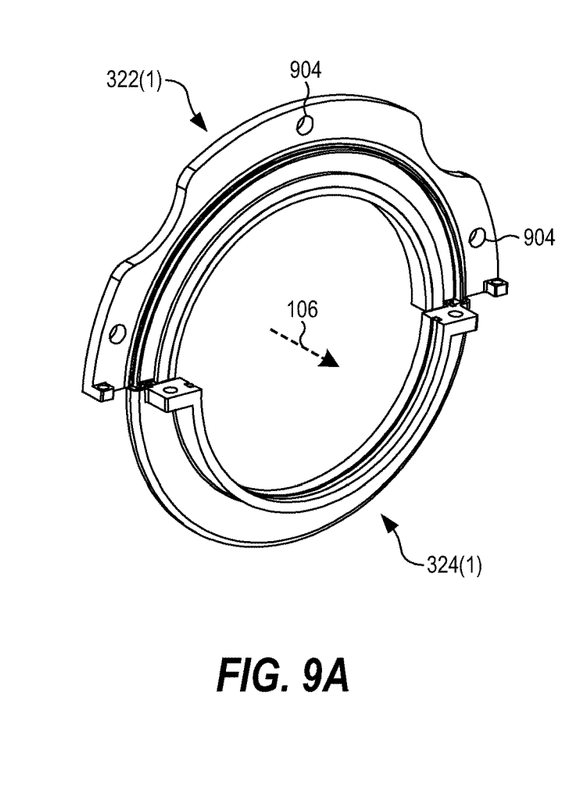
FIGS. 9A-9C illustrate steps for creating a first seal subassembly of the two-piece seal assembly of FIG. 3.

To affix the stator 312 to the sensor housing 102, the stator 312 may form stator mounting holes through which stator bolts 316 can pass to engage with the sensor housing 102 (e.g., see stator mounting holes 904 in FIG. 9A). While FIG. 3 shows six stator bolts 316 arranged in a hexagonal pattern around the rotation axis 106, the stator 312 may form a different number of mounting holes, a different bolt-hole pattern, or both. In any case, the bolt-hole pattern may, for example, align with tapped holes or clearance holes in the first axial end face 218 (e.g., see tapped holes 1002 in FIG. 10A).

The two-piece seal assembly 300 is shown in FIG. 3 with the first rotor subassembly 324(1) nested radially inside of the first stator subassembly 322(1) and the second rotor subassembly 324(2) nested radially inside of the second stator subassembly 324(1). That is, the plane that divides the rotor into the rotor subassemblies 324(1) and 324(2) is the same plane that divides the stator 312 into the stator subassemblies 322(1) and 324(2). However, as the two-piece seal assembly 300 is used, the rotor 314 will rotate around the rotation axis 106 relative to the stator 312. Thus, during each cycle of the rotor 314, each of the rotor subassemblies 324(1) and 324(1) will pass next to both of the stator subassemblies 322(1) and 322(2).

Figure 4:
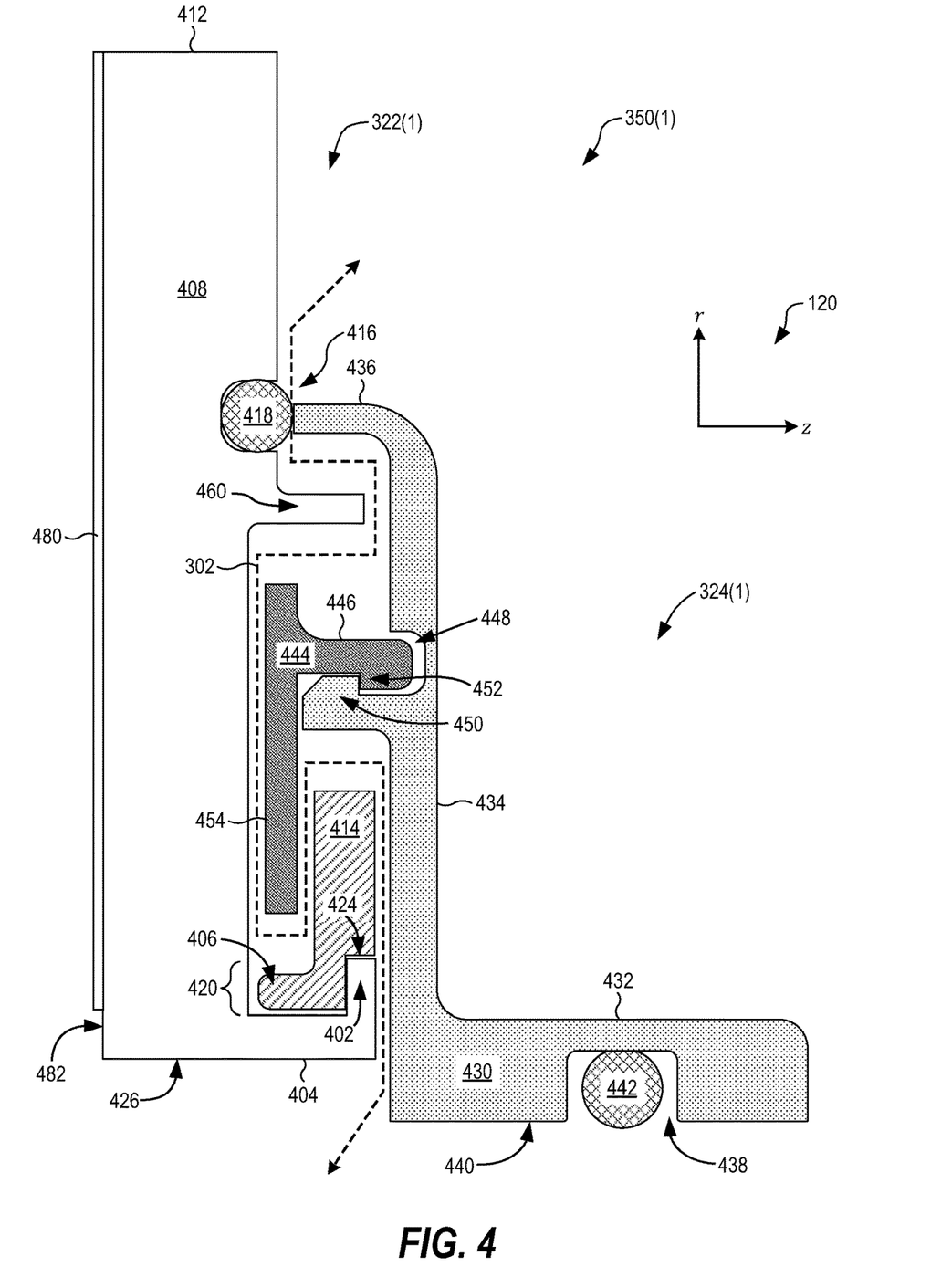
FIG. 4 is a side cut-away view of the two-piece seal assembly of FIG. 3.
Figure 5:
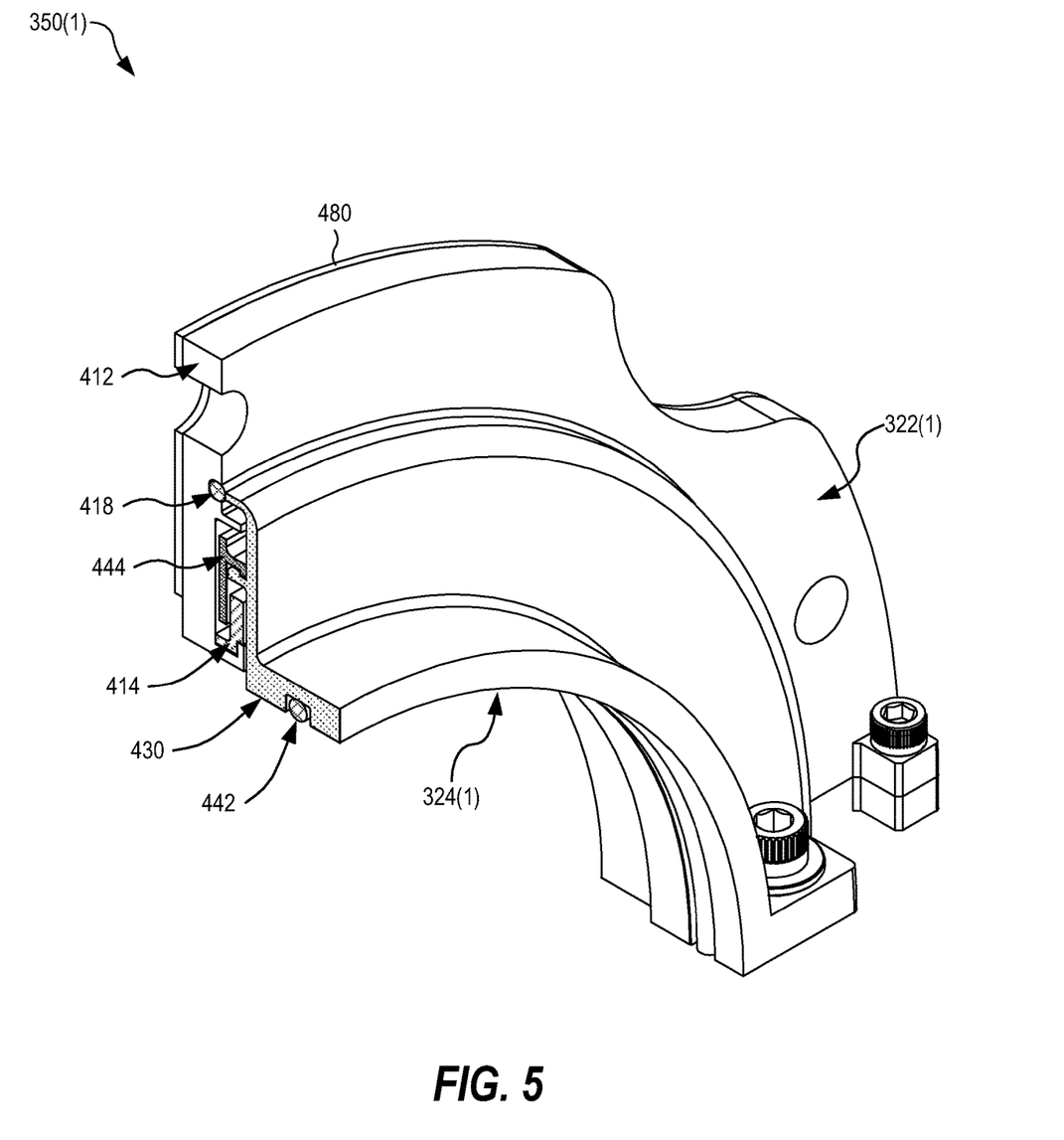
FIG. 5 is a perspective cut-away view of the two-piece seal assembly of FIG. 3.

FIG. 4 is a side cut-away view of the first seal subassembly 350(1) of FIG. 3. FIG. 5 is a perspective cut-away view of the first seal subassembly 350(1). FIGS. 4 and 5 are best viewed together with the following description. The first stator subassembly 322(1) includes a stator housing 412 and a stator insert 414 that are shaped to fit together. Specifically, the stator housing 412 has a stator body 408 that generally extends radially outward from an inward face 426 that lies closest to the axle 104 and parallel to the rotation axis 106. Thus, the inner diameter of the first stator subassembly 322(1) is set by the diameter of the inward face 426. To prevent the first stator subassembly 322(1) from contacting the axle 104, the diameter of the inward face 426 is larger than the outer diameter of the axle 104. The stator body 408 has an axial face 482 that is planar and faces away from the rotor 314. A gasket 480 creates a static contact seal between the stator body 408 and one of the axial end faces 218 and 220 of the sensor housing 102 (see FIG. 2).

The stator housing 412 includes an axial leg 404 that extends axially away from the stator body 408 and shares the radially inward face 426 with the stator body 408. At a distal end of the axial leg 404 is a radial leg 402 that extends radially outward. The radial leg 402, axial leg 404, and stator body 408 form a pocket 420 that is shaped to receive a leg 406 of the stator insert 414. The stator insert 414 also forms a ledge 424 that is shaped to contact the radial leg 402.

The first rotor subassembly 324(1) includes a rotor housing 430 and a rotor insert 444. The rotor housing 430 has a first axial leg 432, a radial leg 434 joined to the first axial leg 432, and a second axial leg 436 joined to the radial leg 434. Radially, the second axial leg 436 is located farther from the rotation axis 106 than the first axial leg 432. The first axial leg 432 forms a groove 438 in an inward face 440 that lies closest to the axle 104 and parallel to the rotation axis 106. The groove 438 is sized to accept a semicircular gasket 442 that directly contacts the axle 104 to create a static contact seal between the first axial leg 432 and the axle 104. The inner diameter of the first rotor subassembly 324(1) is set by the diameter of the inward face 440.

The rotor insert 444 includes an axial leg 446 at the distal end of which is a lip 452. The radial leg 434 also forms a lip 450 that is positioned and shaped to lock with the lip 452. In the example of FIG. 4, the radial leg 434 forms a pocket 448 sized to receive the end of the axial leg 446. The pocket 448 limits radially outward movement of the rotor insert 444, which could cause the rotor insert 444 to separate from the rotor housing 430. The rotor insert 444 also has a radial leg 454 that extends radially inward from the axial leg 446. As shown in FIG. 4, the radial leg 454 is located axially between the rotor insert 414 and stator body 408.

The stator body 408 forms a groove 416 sized to receive a bumper 418. The groove 416 is located radially outward from the rotor insert 444 (i.e., the groove 416 is located at a radial position that is greater than that of the rotor insert 444). The end of the second axial leg 436 contacts the bumper 418 prior to break-in of the seal ring assembly 300. During break-in, the second axial leg 436 abrades away a portion of the bumper 418 to open a gap therebetween. Thus, after break-in there is no physical contact between the stator 312 and rotor 314.

The first stator subassembly 322(1) and first rotor subassembly 324(1) cooperate to form a first segment of a labyrinth 302 that is identified in FIG. 4 by a dashed line. The stator insert 414 and rotor insert 444 advantageously extend the length and number of turns of the labyrinth 302. The stator body 408 may additionally form an axial leg 460 that extends towards, but does not contact, the radial leg 434 of the rotor housing 430. The axial leg 460 also extends the length and number of turns of the labyrinth 302.

Although not shown in FIG. 4, the second seal subassembly 350(2) has a similar geometry to the first seal subassembly 350(1). Accordingly, the second stator subassembly 322(2) and second rotor subassembly 324(2) cooperate to form a second segment of the labyrinth 302. Each of the first and second segments of the labyrinth 302 extends over a semicircular region such that when the seal subassemblies 350(1) and 350(2) are affixed together, the labyrinth 302 fully encircles the rotation axis 106.

To simplify manufacturing and assembly of the first seal subassembly 350(1), the stator housing 412 and stator insert 414 may be machined as separate pieces that are subsequently affixed to each other (e.g., see FIGS. 10A and 10B). However, the stator housing 412 and stator insert 414 could be manufactured as one single component. The same is true for the rotor housing 430 and rotor insert 444.

The stator housing 412 and rotor housing 430 may each be made of steel. Examples of such steel include, but are not limited to, stainless steel, AISI 1010 carbon steel, and AISI 1006 carbon steel. The stator insert 414 and rotor insert 444 may each be made of a polymer. Examples of such polymer include, but are not limited to, rubber, plastic, or polytetrafluoroethylene. Using metal housings 412 and 430 with polymer inserts 414 and 444 reduces manufacturing costs without compromising the functionality of the seal. Polymer inserts 414 and 444 also result in deeper (i.e., longer and with more turns) labyrinths as compared to what can be achieved with conventional metal-based machining. Should the inserts 414 and 444 inadvertently contact each other during operation, the resulting abraded polymer may cause less additional wear than abraded metal.

Figure 6A:
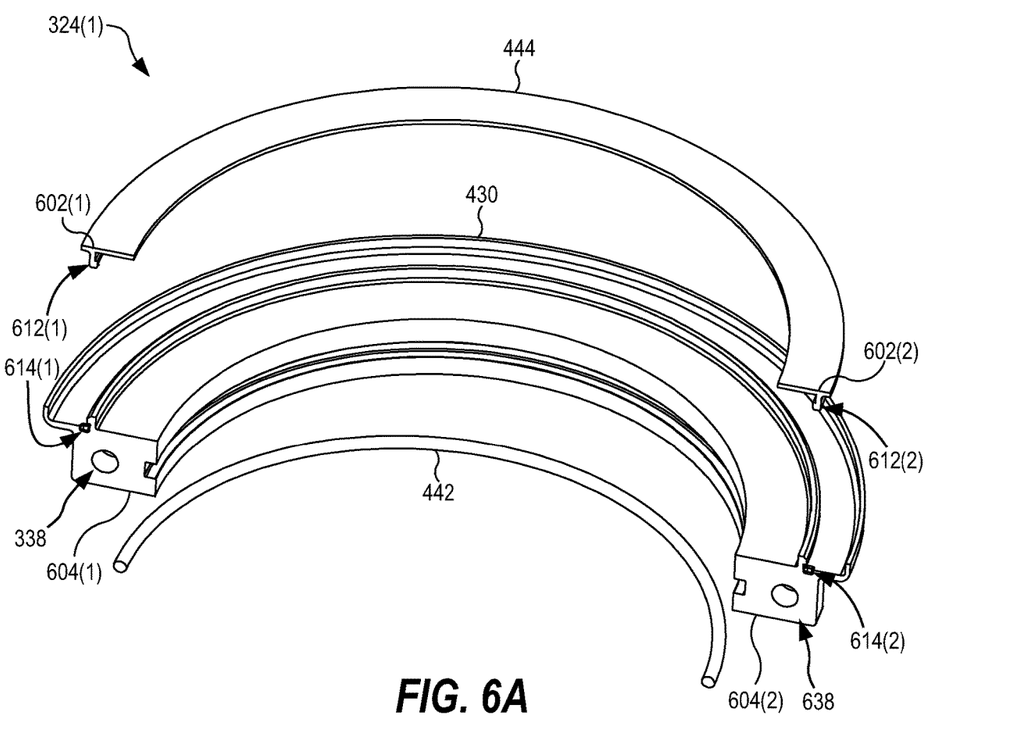
FIG. 6A is an exploded perspective view of a first rotor subassembly of the two-piece seal assembly of FIG. 3, in an embodiment.
Figure 6B:
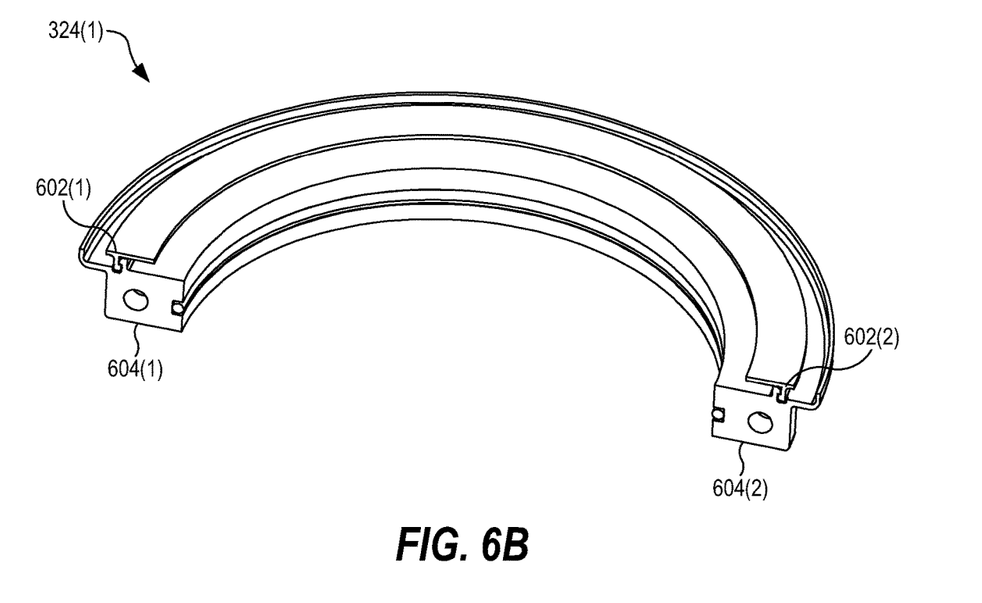
FIG. 6B is a perspective view of the first rotor subassembly when assembled.

FIG. 6A is an exploded perspective view of the first rotor subassembly 324(1) of FIG. 3. FIG. 6B is a perspective view of the first rotor subassembly 324(1) when assembled. FIGS. 6A and 6B are best viewed together with the following description. Each of the rotor housing 430, rotor insert 444, and o-ring is shaped as a semicircular ring. The second rotor subassembly 324(2) of FIG. 3 is shaped similarly to the first rotor subassembly 324(1).

Figure 7A:
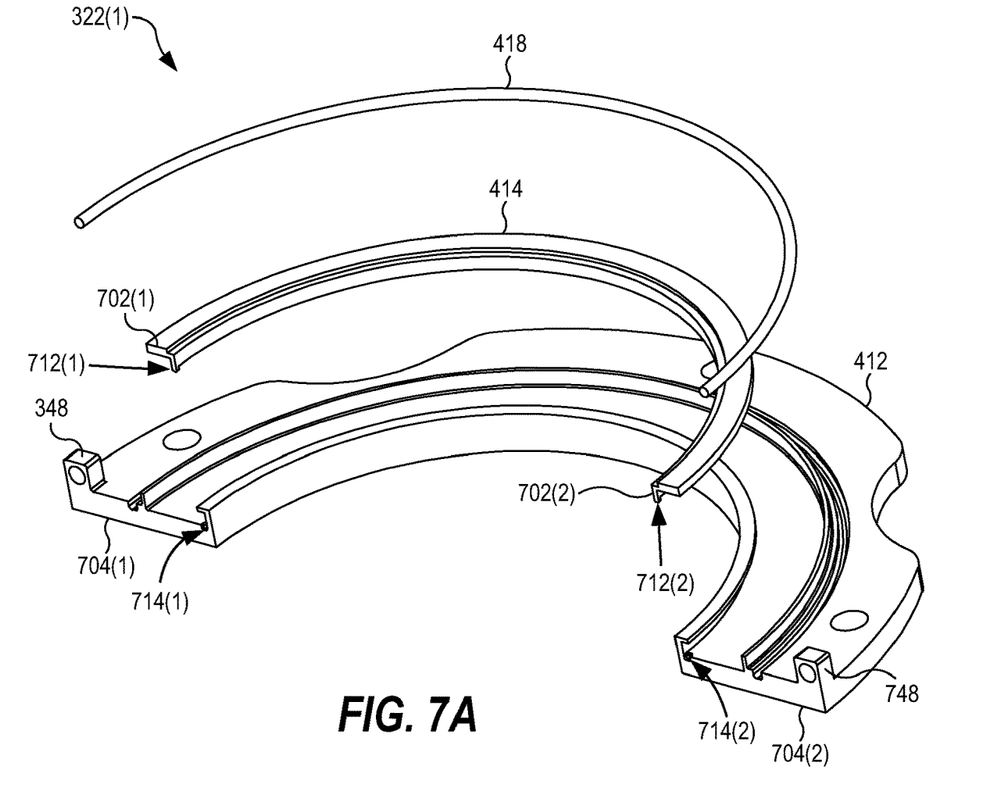
FIG. 7A is an exploded perspective view of a first stator subassembly of the two-piece seal assembly of FIG. 3, in an embodiment.
Figure 7B:
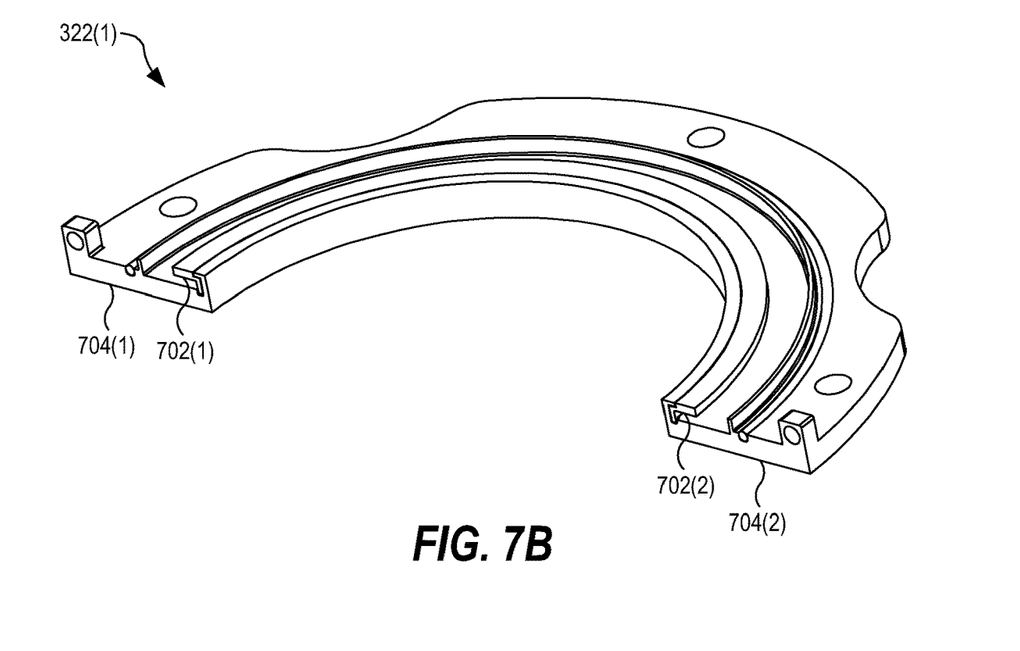
FIG. 7B is a perspective view of the first stator subassembly when assembled.

FIG. 7A is an exploded perspective view of the first stator subassembly 322(1) of FIG. 3. FIG. 7B is a perspective view of the first stator subassembly 322(1) when assembled. FIGS. 6A-7B are best viewed together with the following description. Each of the stator housing 412, stator insert 414, and bumper 418 is shaped as a semicircular ring. The second stator subassembly 322(2) of FIG. 3 is shaped similarly to the first stator subassembly 322(1).

Figure 8A:
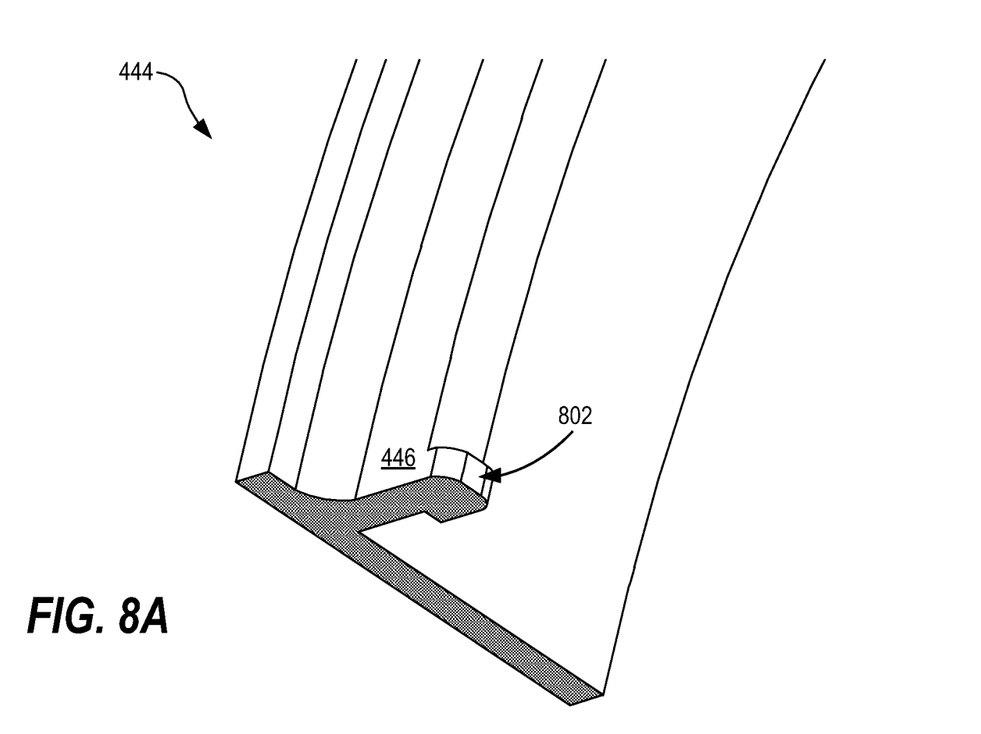
FIG. 8A shows one of two azimuthal ends of a rotor insert of the two-piece seal assembly of FIG. 3, in an embodiment.
Figure 8B:
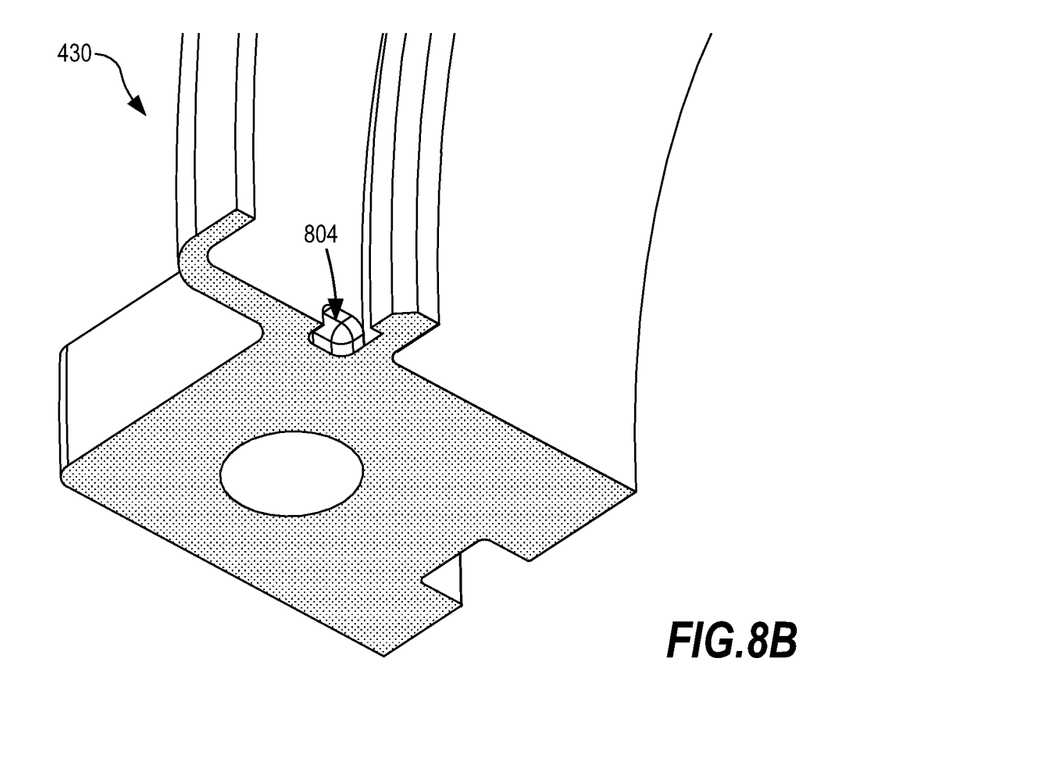
FIG. 8B shows one of two azimuthal ends of a rotor housing of the two-piece seal assembly of FIG. 3, in an embodiment.

FIG. 8A shows one of two azimuthal ends of the rotor insert 444 of FIGS. 4 and 5. FIG. 8B shows one of two azimuthal ends of the rotor housing 430 of FIGS. 4 and 5. FIGS. 8A and 8B are best viewed together with the following description. As shown in FIG. 8A, the leg 446 of the rotor insert 444 forms, near its azimuthal end, a protrusion 802 that extends radially inward. As shown in FIG. 8B, the rotor housing 430 forms, near its azimuthal end, a recess 804 that extends radially outward. The recess 804 is shaped to receive the protrusion 802. When the protrusion 802 snaps into the recess 804, each azimuthal end of the rotor insert 444 is aligned with its respective azimuthal end of the rotor housing 430. In this position, the rotor insert 444 cannot easily move relative to the rotor housing 430, which simplifies installation of the two-piece seal assembly 300.

As shown in FIG. 6A, the rotor insert 444 may form a protrusion at each of its two azimuthal ends. Specifically, a first azimuthal end 602(1) of the rotor insert 444 forms a first protrusion 612(1) while a second azimuthal end 602(2) of the rotor insert 444 forms a second protrusion 612(2). Similarly, a first azimuthal end 604(1) of the rotor housing 430 forms a first recess 614(1) sized to receive the first protrusion 612(1) while a second azimuthal end 604(2) of the rotor housing 430 forms a second recess 614(2) sized to receive the second protrusion 612(2). Each of the protrusions 612(1) and 612(2) is an example of the protrusion 802 of FIG. 8A. Each of the recesses 614(1) and 614(2) is an example of the recess 804 of FIG. 8B.

As the rotor insert 444 slides into its final position relative to the rotor housing 430, each of the protrusions 612(1) and 612(2) snaps into its respective recess 614. At this point, the azimuthal ends 602(1) and 604(1) are aligned (i.e., coplanar) and the azimuthal ends 602(2) and 604(2) are aligned, as shown in FIG. 6B. In other embodiments, the rotor insert 444 only includes one of the protrusions 612(1) and 612(2). In this case, the rotor housing 430 may form both of the recesses 614(1) and 614(2) or only the one recess 614 aligned with the one protrusion 612.

As shown in FIGS. 7A and 7B, the stator insert 414 may also form a protrusion at each of its two azimuthal ends. Specifically, a first azimuthal end 702(1) of the stator insert 414 forms a first protrusion 712(1) while a second azimuthal end 702(2) of the stator insert 414 forms a second protrusion 712(2). Similarly, a first azimuthal end 704(1) of the stator body 408 forms a first recess 714(1) sized to receive the first protrusion 712(1) while a second azimuthal end 704(2) of the stator body 408 forms a second recess 714(2) sized to receive the second protrusion 712(2). Each of the protrusions 712(1) and 712(2) is an example of the protrusion 802 of FIG. 8A. Each of the recesses 714(1) and 714(2) is an example of the recess 804 of FIG. 8B.

As the stator insert 414 slides into its final position relative to the stator body 408, each of the protrusions 712(1) and 712(2) snaps into its respective recess 714. At this point, the azimuthal ends 702(1) and 704(1) are aligned and the azimuthal ends 702(2) and 704(2) are aligned, as shown in FIG. 7B. In other embodiments, the stator insert 414 only includes one of the protrusions 712(1) and 712(2). In this case, the stator body 408 may form both of the recesses 714(1) and 714(2) or only the one recess 714 aligned with the one protrusion 712.

Figure 9B:
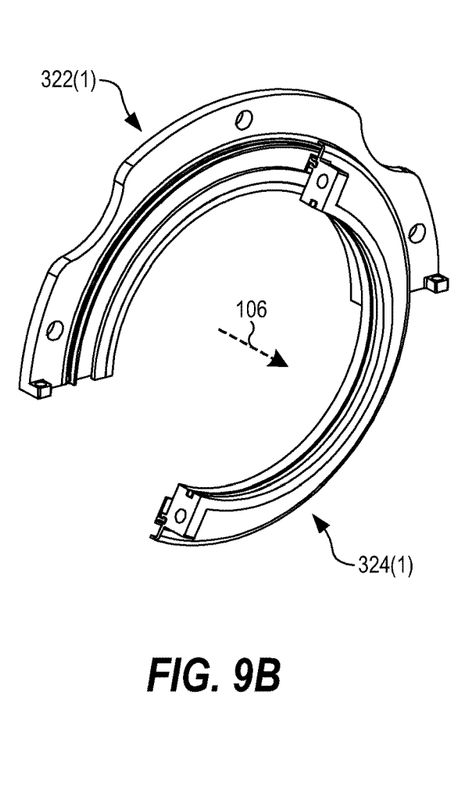
Figure 9C:
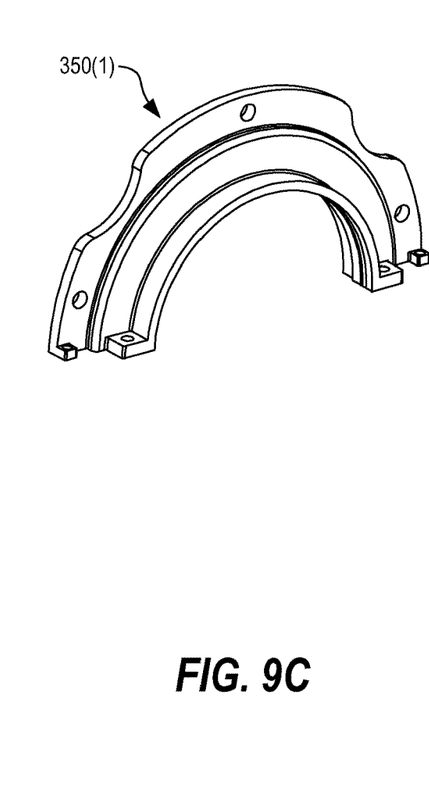

FIGS. 9A-9C illustrate steps for creating the first seal subassembly 350(1) of FIG. 3. In FIG. 9A, the first rotor subassembly 324(1) and first stator subassembly 322(1) are located on opposite sides of a circle centered on the rotation axis 106. In this position, the first rotor subassembly 324(1) and first stator subassembly 322(1) are not engaged with each other. In FIG. 9B, the first rotor subassembly 324(1) is rotated about the rotation axis 106 relative to the first stator subassembly 322. To achieve this rotation, the rotor insert 444 is positioned such that the radial leg 454 is located axially between the rotor insert 414 and the stator body 408, as shown in FIG. 4. In FIG. 9C, the first rotor subassembly 324(1) has been rotated 180° about the rotation axis 106 relative to the first stator subassembly 322(1), thereby forming the first seal subassembly 350(1). The steps depicted in FIGS. 9A-9C may be repeated with the second rotor subassembly 324(2) and second stator subassembly 322(2) to create the second seal subassembly 350(2).

Figure 10A:
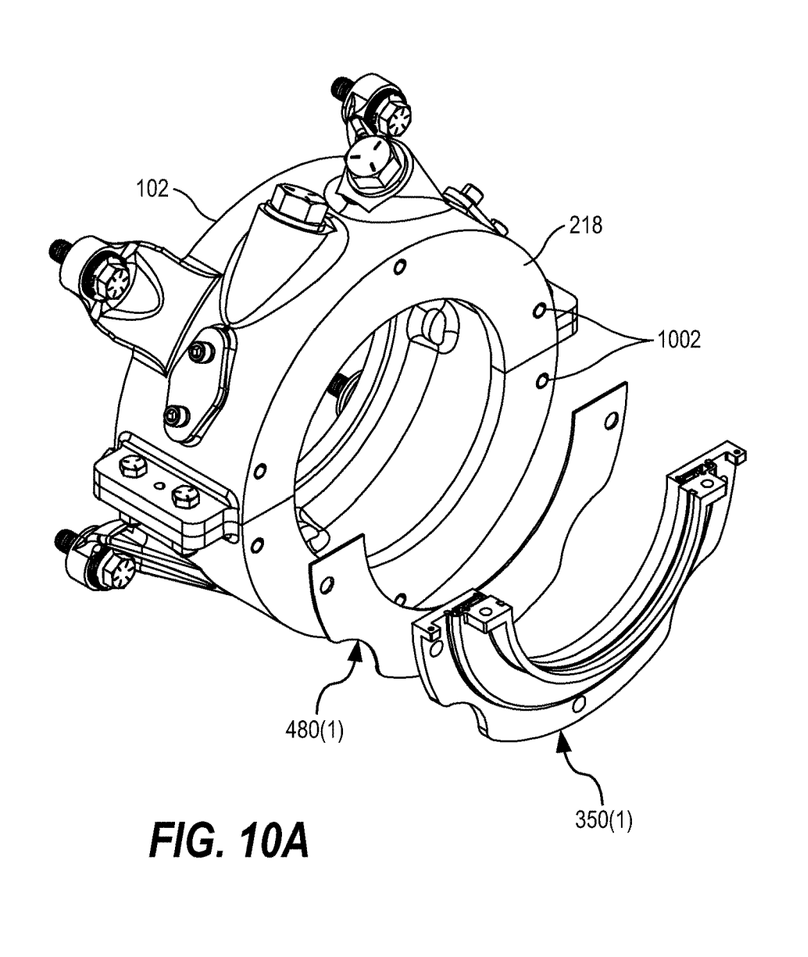
FIG. 10A is an exploded view showing installation of the first seal subassembly.
Figure 11A:
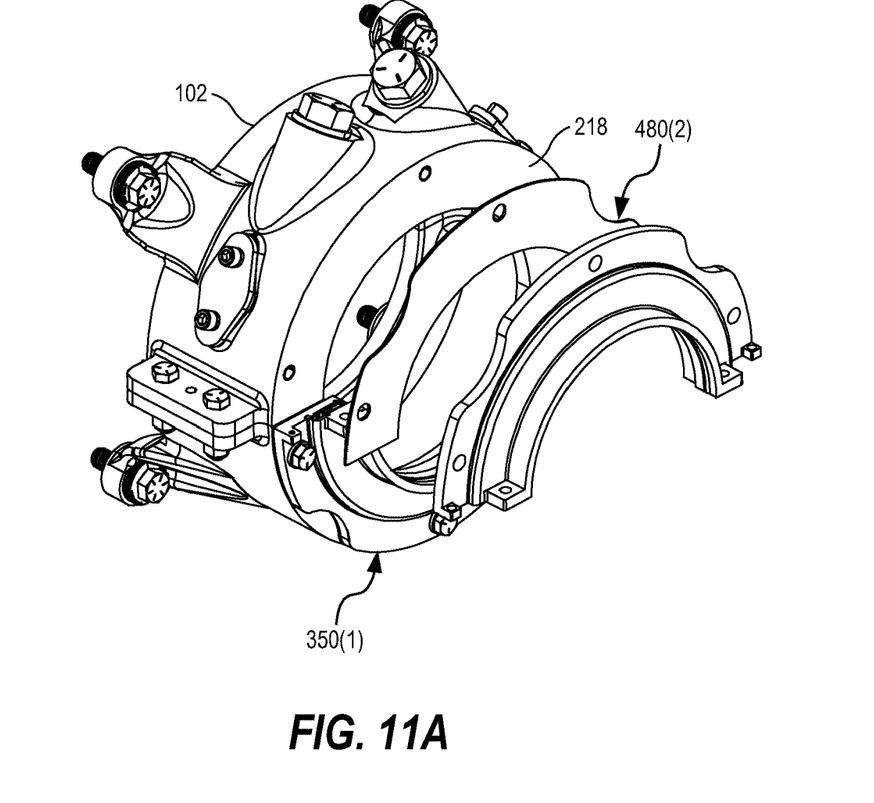
FIG. 11A is an exploded view showing installation of a second seal subassembly of the two-piece seal assembly of FIG. 3.
Figure 11B:
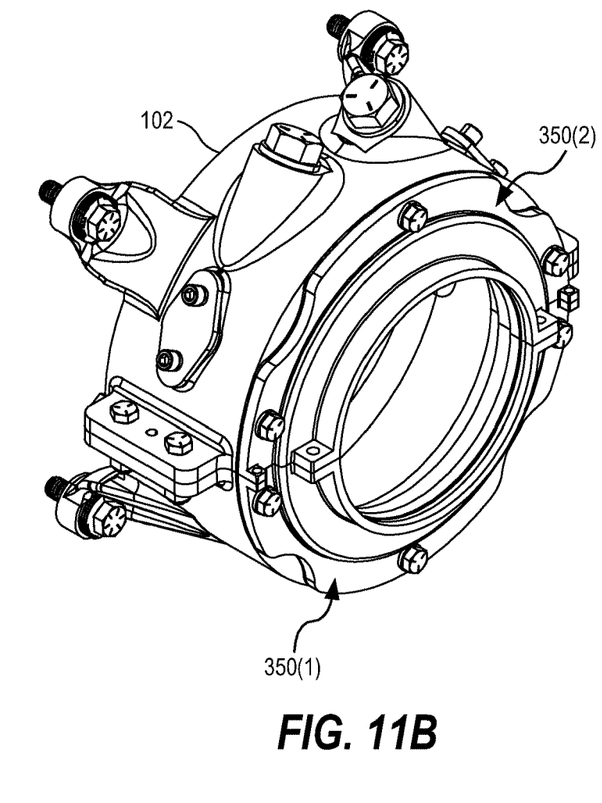
FIG. 11B is a perspective view of the second seal subassembly after installation.
Figure 12A:
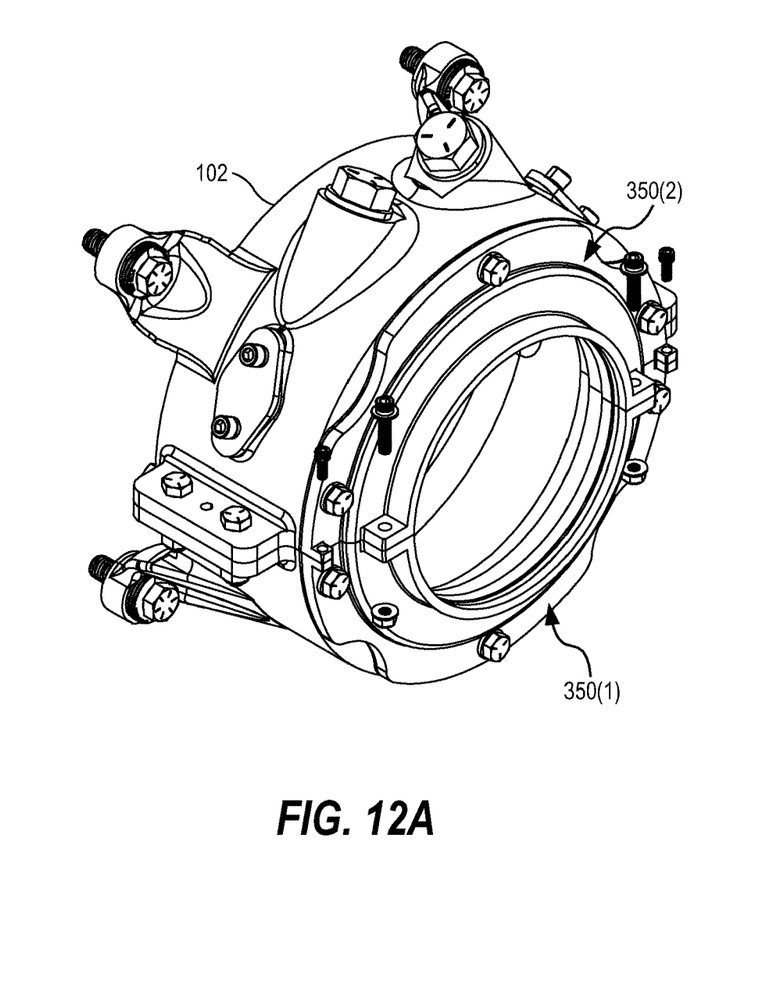
FIG. 12A is an exploded view showing the first and second seal subassemblies being affixed to each other.
Figure 12B:
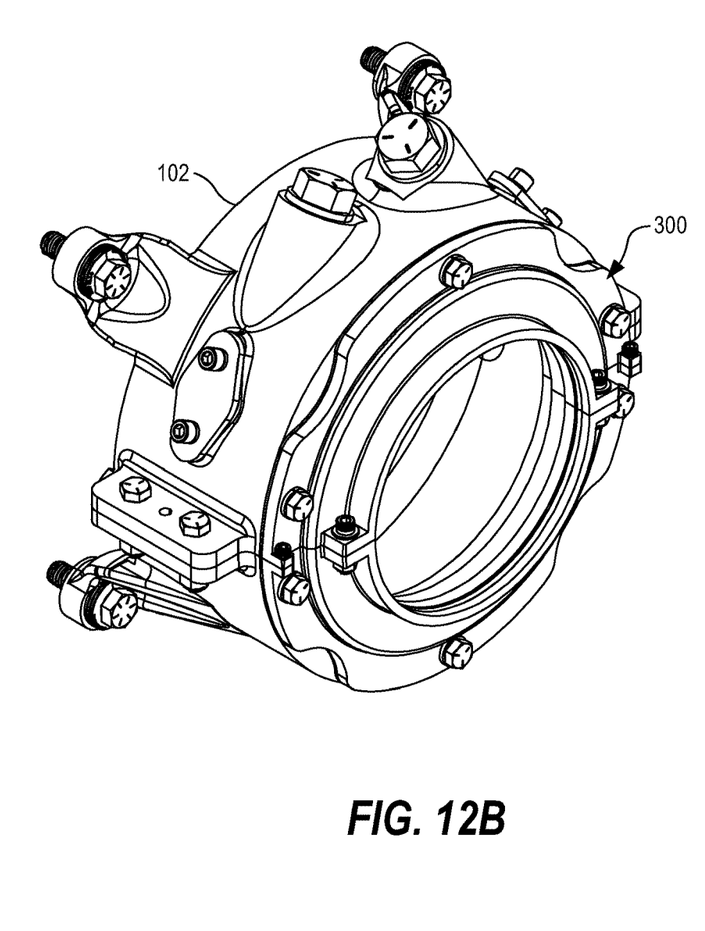
FIG. 12B is a perspective view showing two-piece seal assembly fully installed.

FIG. 10A is an exploded view showing the first seal subassembly 350(1) being installed onto the first axial end face 218 of the sensor housing 102 of FIGS. 1 and 2. FIG. 10B is a perspective view of the first seal subassembly 350(1) after installation. FIG. 11A is an exploded view showing the second seal subassembly 350(2) being installed onto the first axial end face 218 of the sensor housing 102. FIG. 11B is a perspective view of the second seal subassembly 350(2) after installation. FIG. 12A is an exploded view showing the seal subassemblies 350(1) and 350(2) being affixed to each other. FIG. 12B is a perspective view showing the two-piece seal assembly 300 of FIG. 3 fully installed against the sensor housing 102. FIGS. 10A-12B are best viewed together with the following description.

Figure 10B:
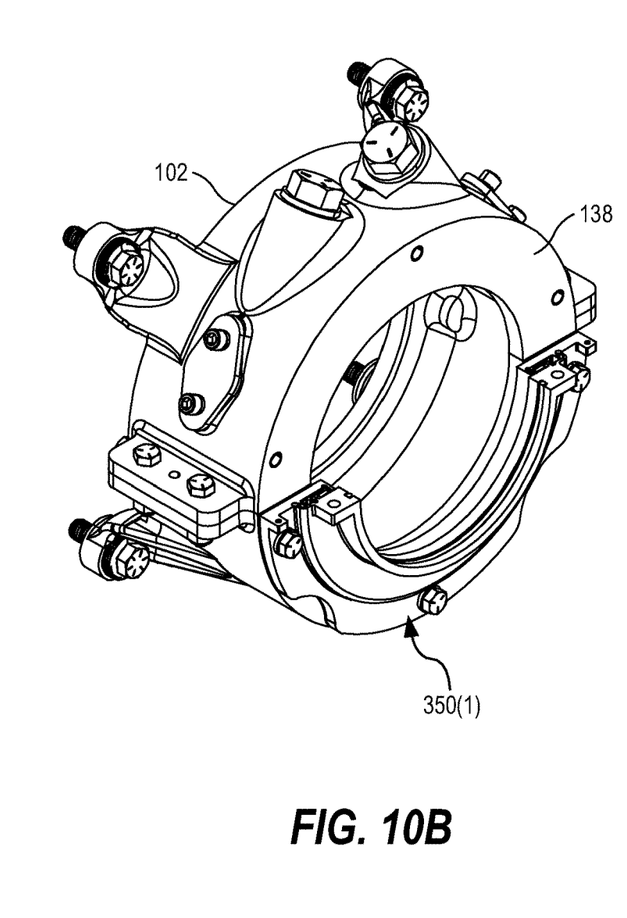
FIG. 10B is a perspective view of the first seal subassembly after installation.

In FIGS. 10A and 10B, a first gasket 480(1) is placed against the lower half of the first axial end face 218. The first seal subassembly 350(1) is then secured to the lower half of the sensor housing 102 using the stator bolts 316 shown in FIG. 3. Grease may be used to retain the first gasket 480(1) in place. FIG. 10A also shows how the first gasket 480(1) forms through holes that align with the bolt pattern of the first semicircular seal subassembly 350(1) and threaded holes in the sensor housing 102.

In FIGS. 11A and 11B, a second gasket 480(2) is placed against the remaining upper half of the first axial end face 218. The second seal subassembly 350(2) is then secured to the upper half of the sensor housing 102 using additional stator bolts 316. Grease may be used to retain the second gasket 480(2) in place.

In FIGS. 12A and 12B, the seal subassemblies 350(1) and 350(2) are affixed to each other to complete installation of the two-piece seal assembly 300 against the sensor housing 102. Specifically, two bolts (see the bolts 328 in FIG. 3) affix the stator subassemblies 322(1) and 322(2) to each other at their azimuthal ends. Similarly, a pair of bolts 318 and nuts 320 affix the rotor subassemblies 324(1) and 324(2) to each other at their azimuthal ends.

In FIG. 12B, the two-piece seal assembly 300 acts as the first seal assembly 208 of FIG. 2. The installation described in FIGS. 10A-12B may be repeated to install, against the second axial end face 220 of the sensor housing 102, a second two-piece seal assembly 300 that acts as the second seal assembly 210 of FIG. 2. The second two-piece assembly 300 may be installed onto the sensor housing 102 either before or after the sensor housing 102 is affixed to the first bearing assembly 103. Alternatively, the second two-piece seal assembly 300 may be partially installed onto the sensor housing 102 before the sensor housing 102 is affixed to the first bearing assembly 103. For example, the seal subassemblies 350(1) and 350(2) may be installed as shown in FIGS. but only loosely bolted to each other to ensure that the second two-piece seal assembly 300 can slide along the axle 104 when positioning the sensor housing 102 against the first bearing assembly 103. After the sensor housing 102 is bolted to the first bearing assembly 103, the bolts joining the seal subassemblies 350(1) and 350(2) may be tightened to their fully specified torque.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. A two-piece seal assembly, comprising:
  first and second stator subassemblies that are affixable to each other to form a ring-shaped stator that encircles a rotation axis of the two-piece seal assembly, each of the first and second stator subassemblies being shaped as a semicircular ring and comprising:
    a stator housing having a stator body, a stator-housing axial leg, and a stator-housing radial leg that cooperate to form a stator-housing pocket; and a stator insert having a stator-insert radial leg and an a stator-insert axial leg, the stator-insert axial leg being shaped to fit inside the stator-housing pocket; and first and second rotor subassemblies that are affixable to each other to form a ring-shaped rotor that encircles the rotation axis, each of the first and second rotor subassemblies being shaped as a semicircular ring and comprising:

a rotor housing having a rotor-housing radial leg forming a rotor-housing pocket; and a rotor insert having a rotor-insert radial leg and a rotor-insert axial leg, a distal end of the rotor-insert axial leg being shaped to fit inside the rotor-housing pocket;

wherein the rotor-insert radial leg is located axially between the stator body and the stator-insert radial leg such that (i) the rotor-insert radial leg and the stator body form therebetween a first radial section of a labyrinth, (ii) the rotor-insert radial leg and the stator-insert radial leg form therebetween a second radial section of the labyrinth, and (iii) the stator-insert radial leg and the rotor-housing radial leg form therebetween a third radial section of the labyrinth.

2. The two-piece seal assembly of claim 1, wherein:
the stator housing of the first stator subassembly has a first azimuthal end and a second azimuthal end;
the stator housing of the second stator subassembly has a third azimuthal end affixed to the first azimuthal end and a fourth azimuthal end affixed to the second azimuthal end;
the rotor housing of the first rotor subassembly has a fifth azimuthal end and a sixth azimuthal end; and
the rotor housing of the second rotor subassembly has a seventh azimuthal end affixed to the fifth azimuthal end and an eighth azimuthal end affixed to the sixth azimuthal end.

3. The two-piece seal assembly of claim 1, each of the stator insert of the first stator subassembly, the stator insert of the second stator subassembly, the rotor insert of the first rotor subassembly, and the rotor insert of the second rotor subassembly comprising polymer.

4. The two-piece seal assembly of claim 1, wherein, for each of the first and second rotor subassemblies:
the rotor-insert axial leg forms a first lip; and
the rotor housing having a rotor-housing axial leg forming a second lip shaped to lock with the first lip.

5. The two-piece seal assembly of claim 1, wherein, for each of the first and second stator subassemblies, the stator insert forms a ledge that is shaped to engage with the radial leg.

6. The two-piece seal assembly of claim 1, wherein, for each of the first and second stator subassemblies, the stator housing forms a groove having a groove radial position that is greater than an outer radius of the rotor insert.

7. The two-piece seal assembly of claim 6, further comprising, for each of the first and second stator subassemblies, a bumper shaped to fit into the groove.

8. The two-piece seal assembly of claim 6, wherein, for each of the first and second rotor subassemblies, the rotor housing forms a groove axial leg at the groove radial position.

9. The two-piece seal assembly of claim 1, wherein, for each of the first and second rotor subassemblies, the rotor housing forming a groove that extends radially outward from a radially inward face of the rotor housing.

10. The two-piece seal assembly of claim 9, further comprising, for each of the first and second rotor subassemblies, a gasket sized to fit in the groove.

11. The two-piece seal assembly of claim 1, wherein:
the stator insert of the first stator subassembly has a first azimuthal end and a second azimuthal end;
the stator insert of the first stator subassembly forms a first protrusion at the first azimuthal end and a second protrusion at the second azimuthal end;
the stator housing of the first stator subassembly has a third azimuthal end and a fourth azimuthal end; and
the stator housing of the first stator subassembly forms a first recess near the third azimuthal end and a second recess near the fourth azimuthal end, the first recess being sized to receive the first protrusion, the second recess being sized to receive the second protrusion.

12. The two-piece seal assembly of claim 1, further comprising, for each of the first and second stator subassemblies, a semicircular gasket configured to create a static contact seal between the stator housing and an axial end face of a sensor housing.

13. A method comprising using the two-piece seal assembly of claim 1 to create a non-contact seal between a rotating axle of a wheelset and a stationary sensor housing of the wheelset.

14. A method comprising installing the two-piece seal assembly of claim 1 onto a wheelset.

15. The method of claim 14, wherein said installing comprises:
affixing the first stator subassembly and the first rotor subassembly to form a first seal subassembly;
affixing the second stator subassembly and the second rotor subassembly to form a second seal subassembly;
installing the first seal subassembly against an axial end face of a sensor housing of the wheelset; and
installing the second seal subassembly against the axial end face.

16. The method of claim 15, further comprising:
installing a first gasket between the first seal subassembly and the axial end face; and
installing a second gasket between the second seal subassembly and the axial end face.

17. The two-piece seal assembly of claim 1, wherein, for each of the first and second stator subassemblies, the stator housing forms an additional axial leg that cooperates with the rotor housing to extend a length and a number of turns of the labyrinth.

18. The two-piece seal assembly of claim 17, the additional axial leg having a radial position that is greater than both an outer diameter of the stator insert and an outer diameter of the rotor insert.

19. The two-piece seal assembly of claim 1, each of the stator housing of the first stator subassembly, the stator housing of the second stator subassembly, the rotor housing of the first rotor subassembly, and the rotor housing of the second rotor subassembly comprising metal.

20. The two-piece seal assembly of claim 12, further comprising the sensor housing.

* * * * *